United States Patent [19]
Mysliwiec et al.

[11] Patent Number: 5,272,850
[45] Date of Patent: Dec. 28, 1993

[54] PANEL CONNECTOR

[75] Inventors: Leonard J. Mysliwiec; Timothy L. Searle, both of Ft. Wayne; George K. MacAleese, Huntington, all of Ind.

[73] Assignee: ICON, Incorporated, Ft. Wayne, Ind.

[21] Appl. No.: 695,972

[22] Filed: May 6, 1991
(Under 37 CFR 1.47)

[51] Int. Cl.⁵ .................................................. E04C 3/02
[52] U.S. Cl. .................................... 52/586; 52/582; 52/718.01; 52/775
[58] Field of Search ............ 52/578, 775, 718.1, 52/586

[56] References Cited

U.S. PATENT DOCUMENTS

| | | | |
|---|---|---|---|
| 2,414,628 | 1/1947 | Battin | 52/586 |
| 3,663,386 | 1/1968 | Elflein et al. | 52/586 |
| 3,771,277 | 11/1973 | Rausch et al. | 52/468 |
| 3,780,481 | 12/1973 | Tomkins | 52/265 |
| 4,599,841 | 7/1986 | Haid | 52/403 |
| 4,701,066 | 10/1987 | Beam et al. | 403/298 |

Primary Examiner—Carl D. Friedman
Assistant Examiner—Matthew E. Leno
Attorney, Agent, or Firm—Lundy & Associates

[57] ABSTRACT

A panel connector comprising first and second members and a lock. The first and second members define an axis. The first and second members are slideable in relation to each other along the axis. The members also are slideable in relation to each other transverse to the axis. The lock has engaged parts connected to the first and second members, respectively. The lock limits movement of the members transverse to the axis. The lock is disengaged by movement of the members axially relative to the lock.

28 Claims, 5 Drawing Sheets

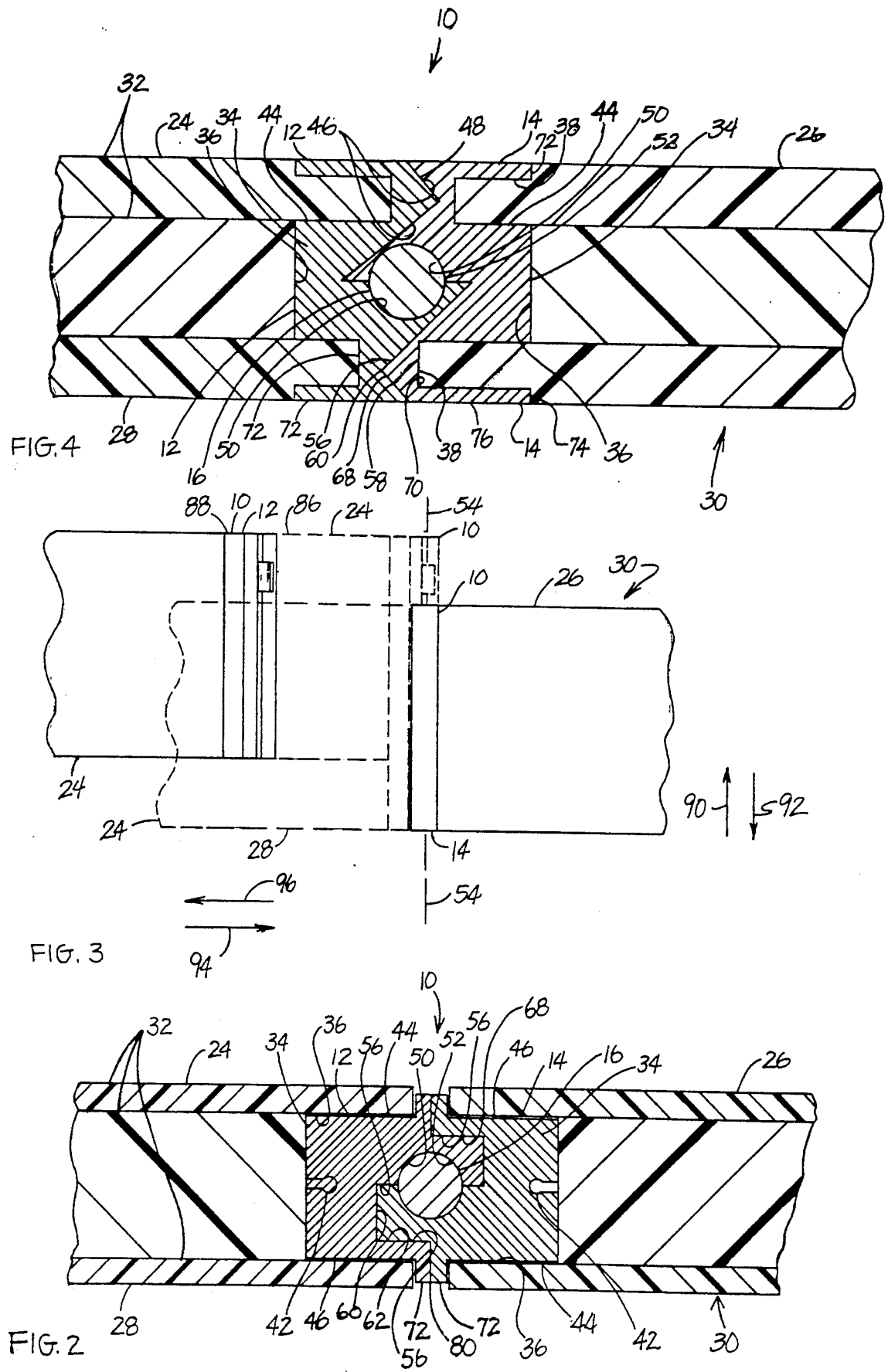

PANEL CONNECTOR

BACKGROUND OF THE INVENTION

The present invention pertains to display hardware, partitions, movable walls, and structural panels, subject to repeated assembly and disassembly, and more particularly pertains to a panel or partition connector.

Many portable structures, such as portable display units, trade show booths and building partitions are large and heavy and must be both strong and stable when erected, yet must be easily disassembled and reassembled. If bolts and nuts or other threaded fasteners are used to hold panels together, assembly and disassembly times are very lengthy. Some alternative fasteners, such as ferrules and tabs and matching slots are quicker to assemble on an individual basis, but are generally not practical for joining together large and heavy panels, since assembly requires that the panels be pushed together with great accuracy and such fasteners may be weak or lack the required strength and rigidity. Other fasteners, in the nature of hinges with removable pins, may be stronger and easier to assemble, but require pins, which may be hard to install and be easily lost.

It is therefore highly desirable to provide an improved panel connector.

It is also highly desirable to provide an improved panel connector which is easy to assemble and disassemble.

It is also highly desirable to provide an improved panel connector which can join heavy panels together with strength and rigidity.

It is also highly desirable to provide an improved panel connector which provides for separation of panels without requiring removal of parts of the panel connector from an associated panel.

It is finally highly desirable to provide an improved panel connector which meets all of the above desired features.

SUMMARY OF THE INVENTION

It is an object of the invention to provide an improved panel connector.

It is another object of the invention to provide an improved panel connector which is easy to assemble and disassemble.

It is another object of the invention to provide an improved panel connector which can join heavy panels together with strength and rigidity.

It is another object of the invention to provide an improved panel connector which provides for separation of panels without requiring removal of parts of the panel connector from an associated panel.

It is finally an object of the invention to provide an improved panel connector which meets all of the above desired features.

In the broader aspects of the invention there is provided a panel connector comprising first and second members and a lock. The first and second members define an axis. The first and second members are slideable in relation to each other along the axis. The members also are slideable in relation to each other transverse to the axis. The lock has engaged parts connected to the first and second members, respectively. The lock limits movement of the members transverse to the axis. The lock is disengaged by movement of the members axially relative to the lock.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 2 is a partial cross-sectional view of the panels and panel connector of FIG. 1, taken substantially along section line 2—2.

FIG. 3 is a partial side plan view of the panels and panel connector of FIG. 1. A first member is shown in a disassembled configuration in solid lines and in partially assembled and assembled configurations in dashed lines. A second member, in all configurations, is shown in solid lines.

FIG. 4 is a partial cross-sectional view of an alternative embodiment of the panel connector of the invention similar to FIG. 2.

DESCRIPTION OF A SPECIFIC EMBODIMENT

Figure 1:
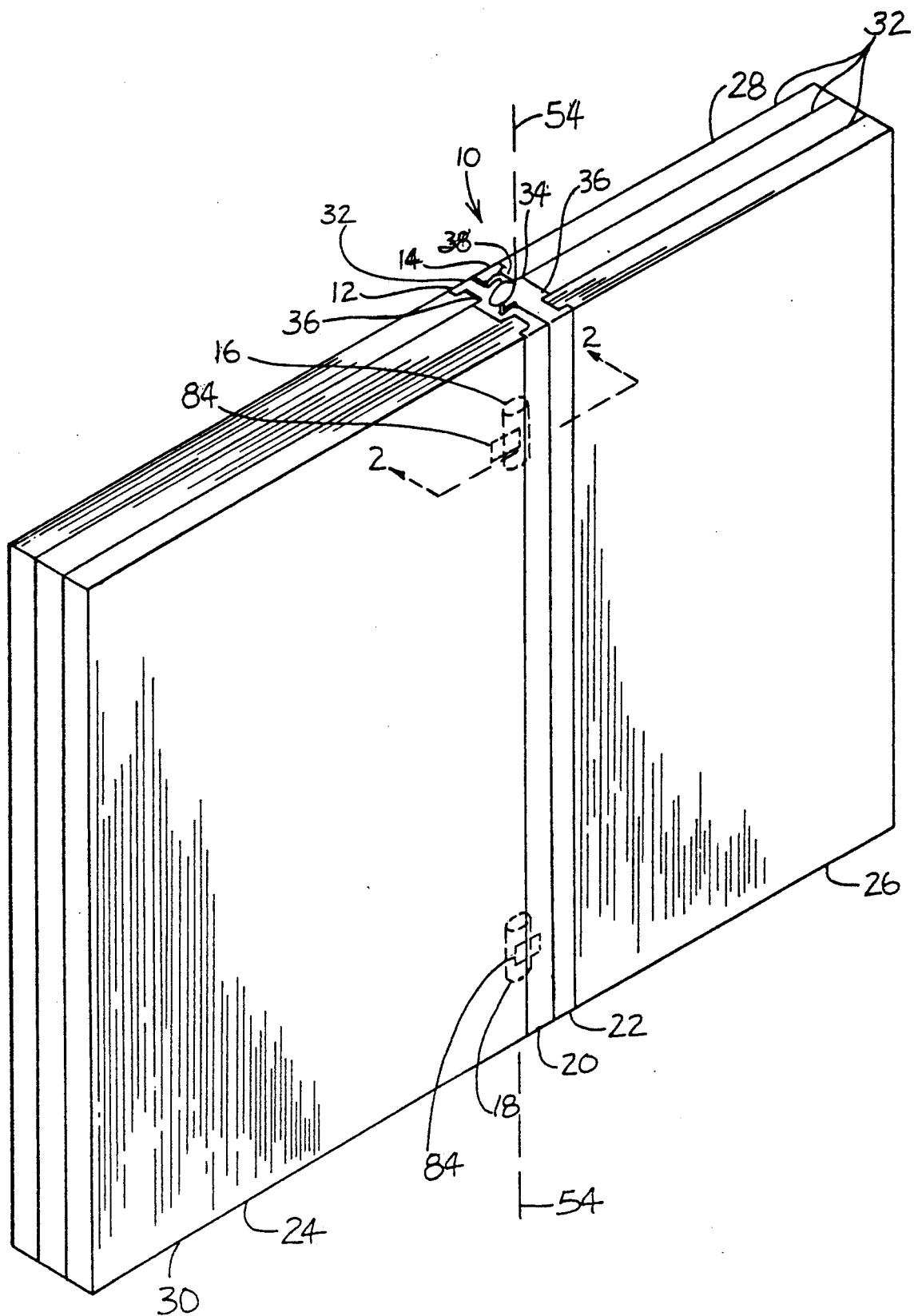
FIG. 1 is a perspective view of an embodiment of the panel connector of the invention and a pair of panel members in joined condition. The location of lock parts is indicated by dashed lines.

The panel connector 10 of the invention provides an improved partition movable wall or structural panel, and more particularly, improved hardware for such structures. The improved panel connector of the invention provides a connector which allows large and heavy structural panels, movable walls and/or structural partitions to be assembled and disassembled relatively easily and yet result in a strong and stable structure. The several embodiments shown (see FIGS. 2, 4, 5, and 7) each include a panel connector 10 of the invention which has a cross-sectional shape that is unchanged by inverting. The panels, partitions or movable walls embodying the invention are connected by placing two members of the panel connector 10, one of the members being an inverted version of the other member, together and locking the same together in an assembled condition. Thus, each of the members of the panel connector 10 have a cross-section that is unchanged by inversion. These are shown in FIGS. 2, 4, 5, 6 and 7. And, each are locked together by the locking means shown in either FIGS. 1 and 3 or FIG. 10, as desired.

The cross-sections of the panel connector 10 have in common complementary portions which fit together when the structural panels, movable walls and partitions of the invention are assembled. Each of the panel connectors also have a complementary portion or peak. The peak of one member of the panel connector 10 of the invention extends from the member and fits within the valley of the other member of the panel connector 10 of the invention when assembled. Thus, each panel connector of the invention has what may be termed generically a peak and valley configuration of a variety of shapes. These peaks and valleys each have guiding surfaces thereon which guide the panels together during use while minimizing the lifting of one panel relative to the other, thus, rendering more easily the assemblage of the walls, panels and partitions of the invention. In assembled condition, they are locked together with both strength and rigidity. The various embodiments of the invention will now be described with reference to the Figures of the drawing.

Referring to FIG. 1, the panel connector 10 of the invention includes a pair of members 12, 14 and a pair of lock parts 16, 18. First and second members 12, 14 are identical in shape, however, their orientations, upright 20 and inverted 22, are opposite. Joined to each member 12, 14 are first and second panels 24, 26. FIG. 1 shows panel connector 10 in assembled configuration 28, in which first and second members 12, 14 are fully interposed and first and second panels 24, 26 are connected in edge to edge relationship to form a single composite panel 30, with panel connector 10 providing support as a vertically extending stud. Panels 24, 26 may have a plurality of layers 32 or may be solid.

Members 12, 14 each have an attachment portion 34, which is joined to a respective panel 24, 26. Members 12, 14 and panels 24, 26 may be joined together by a variety of means. Members 12, 14 are, at least roughly, complementary in shape to respective panels 24, 26 and fit within recesses 36 in the edges of panels 24, 26.

Figure 5:
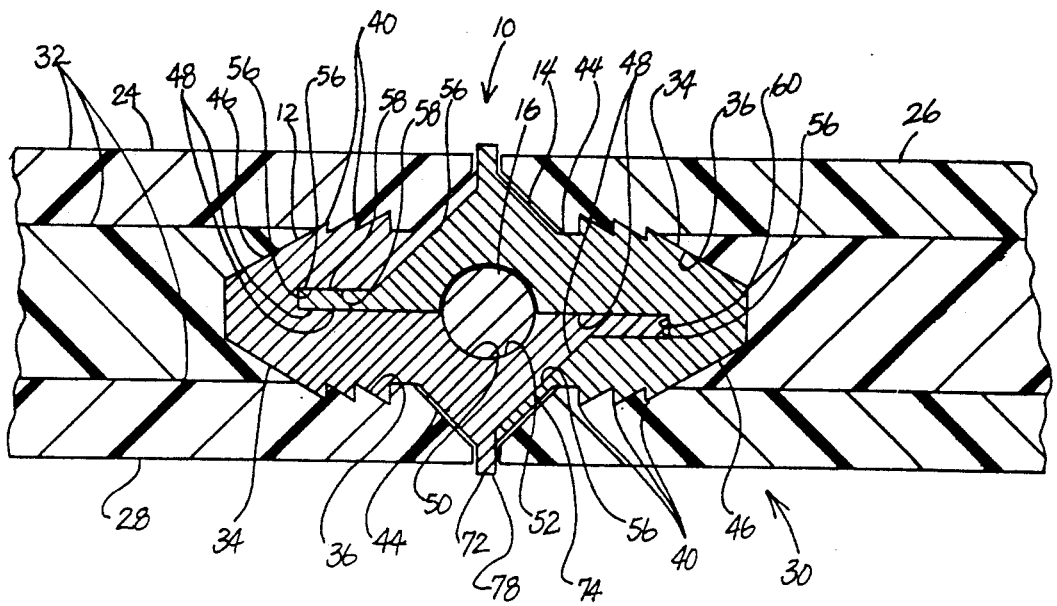
FIG. 5 is a partial cross-sectional view of another alternative embodiment of the panel connector of the invention similar to FIG. 2.
Figure 6:
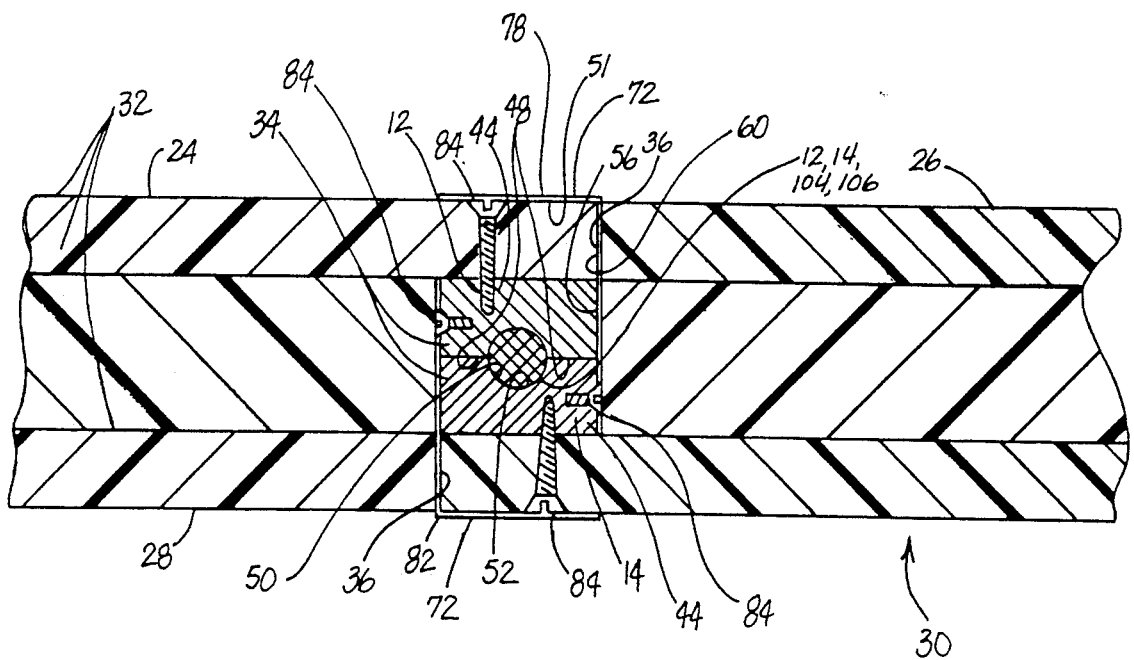
FIG. 6 is a partial cross-sectional view of yet another alternative embodiment of the panel connector of the invention similar to FIG. 2.

Referring now to FIGS. 2, 4, 5, 6, 7 and 8, outer layers 32 of panels 24, 26 extend out beyond recesses 36. In the particular embodiment of the invention of FIGS. 4, 7 and 8, outer layers 32 of panels 24, 26 fit within receivers 38 on opposite sides of attachment portions 34. In the particular embodiment of the invention of FIG. 5, attachment portions 34 lack receivers 38 and instead grip respective panels 24, 26 with a sequence of ridges or barbs 40. In the particular embodiment of the invention of FIG. 2, attachment portions 34 lack receivers 38 or ridges or barbs 40, but instead are compressed between outer layers 32. Compression slots 42 are used where needed to increase resilience and prevent excessive deformation. In these embodiments of the invention, layers 32 are held in place by friction, but alternatively, fasteners or adhesive may also be used as shown in FIG. 6.

In FIG. 6, one of the outer layers 32 of each panel 24, 26 extends out beyond a recess 36 and is fastened to a respective member 12, 14 by screws 84 or other fasteners not shown and the other outer layer 32 is set back.

Figure 7:
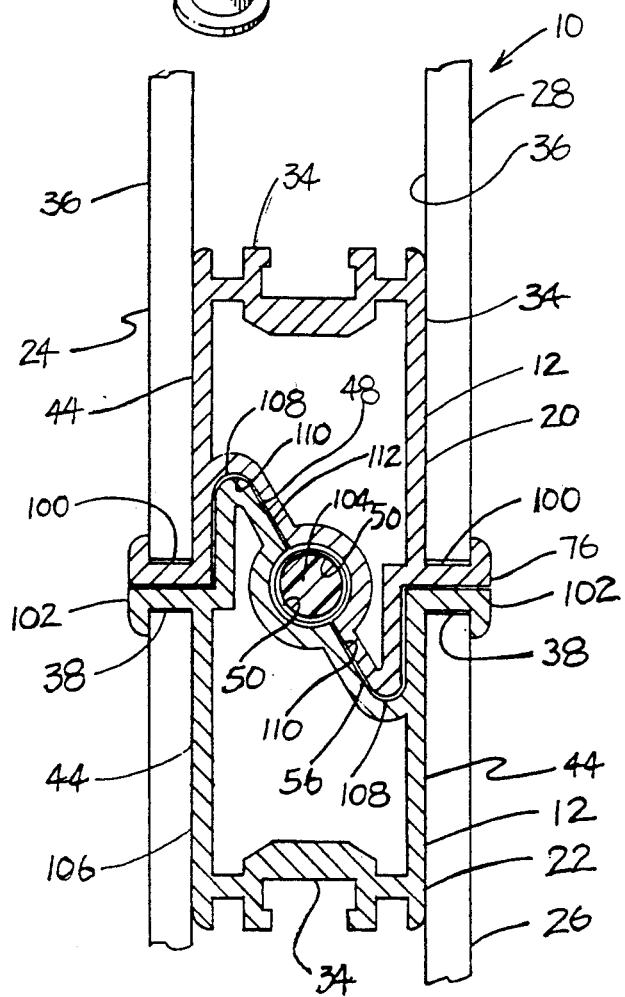
FIG. 7 is a partial cross-sectional view of yet another alternative embodiment of the panel connector of the invention similar to FIG. 2.
Figure 8:
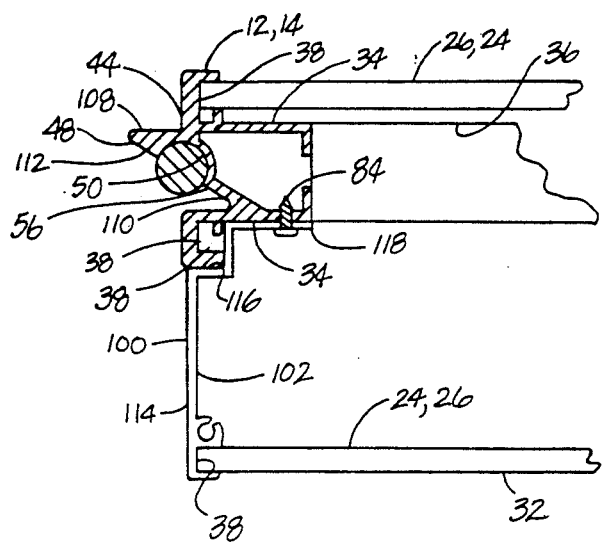
FIG. 8 is a partial cross-sectional view of yet another alternative embodiment of the panel connector of the invention similar to FIG. 7.
Figures 9A, 9B:
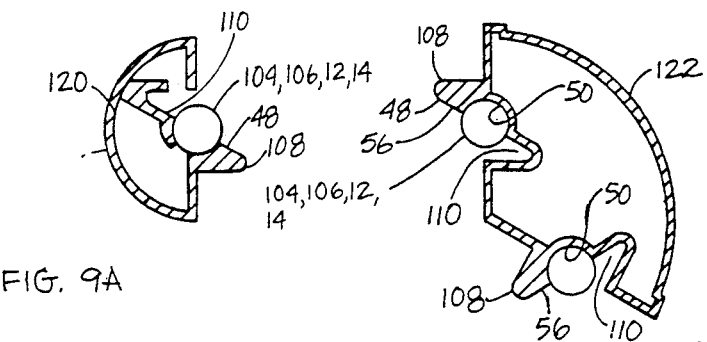
FIGS. 9A through E are cross-sectional views of end caps and connectors of the embodiments shown in FIGS. 7 and 8.
Figure 9C:
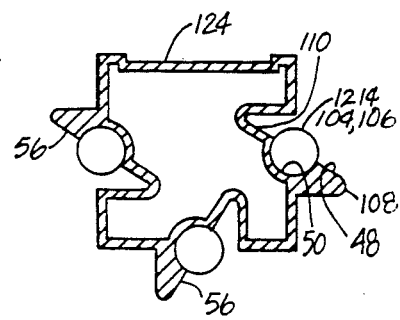
Figure 9D:
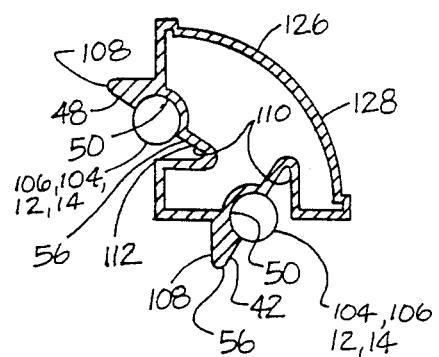
Figure 9E:
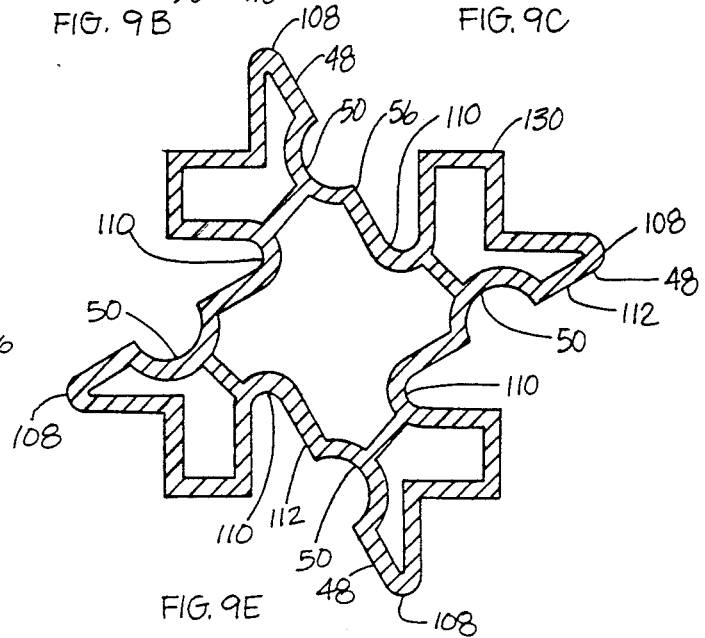

Referring now to FIGS. 7 and 8, still other particular embodiments of the invention are shown. In this embodiment, the panels 24 and 26 positioned on opposite sides of the attachment portion 34 and distal ends thereof are positioned within receivers 38 as shown in FIG. 4.

However, in the embodiment of FIG. 8, the embodiment of FIG. 7 is shown with extensions 100 by which extremely wide composite panels 30 can be provided when desired. The panel connector 10 of the invention is connected to an extension 100 which includes its own receivers 38 which cooperate with the opposite receiver 38 of the connector 10 to provide a widened composite panel 30. A pair of extensions 100 also can be positioned on both sides of the connector 10 and with the panels 24, 26 positioned within the receivers 38 of the extensions 100 thereby providing composite panels 30 of extremely wide widths, as desired.

Reference is now made to FIGS. 1, 2, and 3. Each member 12, 14 is elongate and has a generally uniform horizontal cross-section. Each member 12, 14 has a body 44 and a channel 46. In a particular embodiment of the invention, each body 44 is unitary with a respective channel 46.

Channel 46 has an inner surface 48, which defines a geometric shape, that is unchanged by inverting. The terms "inverting" and "inverted" refer herein to rotation through 180 degrees in a plane defined by the two longest dimensions of a surface, such that top and bottom and right and left are interchanged.

Inner surfaces 48 of first and second members 12, 14 are sufficiently smooth to have low frictional resistance when sliding against each other and are generally contiguous with each other, over their entire lengths, when panel connector 10 is in assembled configuration 28. In a particular embodiment of the invention, inner surfaces 48 of members 12, 14 are generally planar or have generally planar portions. In another particular embodiments of the invention, inner surfaces 48 of members 12, 14 are complementary in shape to each other.

Inner surfaces 48 are each divided by a trench 50, which extends the entire length of member 12, 14. In assembled configuration 28, trenches 50 of first and second members 12, 14, each define half of a longitudinal bore 52, of constant cross-section. Bore 52 has a longitudinal axis 54 parallel to the longest dimension of members 12, 14. In a particular embodiment of the invention, panel connector 10 and bore 52 are coaxial. In another particular embodiment of the invention, trenches 50 of first and second members 12, 14 are identical.

Inner surface 48 includes a guide surface 56 on both sides of trenches 50. Body guide surface 56 is divided into side surfaces 58 and an end surface 60 disposed between side surfaces 58 and define peaks 108 and valleys 110.

In a particular embodiment of the invention, adjoining channel and body guide surfaces 56 are contiguous along their entire lengths with and complementary in shape to adjoining body guide surfaces 56 and define complementary outwardly extended tongues or peaks 108 and inwardly extended grooves or valleys 110.

Referring to FIG. 4, channel flanges 72 extend out from body 44 and overlay panels 24, 26 at 74. This increases the strength of panel connector 10 and provides oversize double flange joints 76 in composite panel 30.

Referring now to FIG. 2, in another particular embodiment of the invention, channel flanges 74 are recessed from body flanges 72 and with appropriately shaped panels 24, 26 provide simple double flange joints 80 in composite panel 30.

Referring now to FIG. 5, in yet another particular embodiment of the invention, body flanges 72 do not adjoin but instead only body flange 72 of the opposite member 12 or 14 extend outwardly of body 44 and provide a simple single flange joint 78 in composite panel 30.

Referring now to FIG. 6, in a particular embodiment of the invention, a single flange 72 overlays the exterior of composite panel 30 providing a wide single flange joint 82.

Referring now to FIGS. 7 and 8, in a particular embodiment of the invention, flanges 74 extend out from body 44, and together with body 44 receive panels 24, 26. Flanges 74 adjoin each other and provide an oversized, double flange joint 102 in composite panel 30.

Referring now to FIGS. 1, 2, and 3, first and second lock parts 16, 18 are joined to respective bodies 44 in trenches 50, by means of suitable fasteners. Each lock part 16, 18 occupies the trench 50 of the member to which it is attached and loosely occupies the other trench 50 and thus loosely plugs bore 52. In particular embodiments of the invention, first and second lock parts 16, 18 are complementary and are disposed in complementary positions in trenches 50 and thus each member 12, 14 and respective lock parts 16, 18 form the mirror image of the other member 14, 12 and respective lock parts 16, 18.

Referring now to FIG. 3, panel connector 10 and a composite panel 30 having lock parts 16, 18 may be changed between fully assembled configuration 28, a plurality of partially assembled configurations 86, one of which is shown, and a disassembled configuration 88, by movement of members 12, 14 relative to each other. In fully assembled configuration 28, as indicated above, members 12, 14 are contiguous along their entire lengths. In partially assembled configurations 86, members 12, 14 are contiguous only for a part of their respective lengths. In disassembled configuration 88, members 12, 14 are non-contiguous.

Members 12, 14 are free to slide relative to each other, in opposed forward and aft directions 90, 92, along linear axis 54, and in a plurality of opposed inward and outward directions 94, 96, transverse to linear axis 54, two pair of which are shown in FIG. 3. Directions: forward 90, aft 92, inward 94, and outward 96, refer to motion of first member 12 relative to a fixed second member 14, as indicated by designated arrows in FIG. 3. Motion in forward direction 90 is limited by abutment of lock parts 16, 18. Motion in inward direction 94 is limited by full engagement of members 12, 14. In a particular embodiment of the invention, motion in aft direction 92, is unlimited and motion in outward direction 96 is limited by engagement of lock parts 16, 18 with trenches 50. Panel connector 10 may thus be disassembled by relative movement solely in aft direction 92 and also by a combination of relative movement in aft direction 92 and in outward direction 96.

Movement of members 12, 14 is guided by adjoining body and channel surfaces 56 which prevent the twisting and misaligning of members 12, 14, relative to each other during assembly and disassembly. At least one pair of respective body and channel surfaces are engaged continuously, during assembly and disassembly.

In another particular embodiment, lock parts 16, 18 are completely eliminated, and thus, trenches 50 and bore 52 are not occupied the entire length thereof. See FIG. 10. In this embodiment, members 12 and 14 are free to slide relative to each other in all directions 90, 92, 94, 96, and composite panel 30 is formed by placing members 12, 14 into a fully assembled configuration 28 and placing a locking rod 104 and locking rod and foot 106 within bore 52 formed by the trenches 50 in assembled configuration 28 from the top and bottom, respectively. Locking rods 104 and/or 106 will hold members 12, 14 together in assembled configuration 28 thereby forming composite panel 30.

In a specific embodiment of the invention, panel connector 10 is formed of aluminum, plastic, wood or the like, and locking rod 104 is formed of a self-lubricating material such that the positioning or the removal of locking rods 104 and 106 within bore 52 is made easy. In a specific embodiment, locking rods 104 and 106 is made of NYLON polyamide material.

Referring to FIGS. 7 and 8, members 12, 14 each have an attachment portion 34 which is joined to a respective panel 24, 26. Panels 24, 26 fit into receivers 38 of attachment portions 34. Panels 24, 26 are held within receivers 38 by friction or, in a particular embodiment, may be secured therein by screws extending through panels 24, 26 and into attachment portion 34 as suggested by FIG. 6.

In the embodiments of FIGS. 7 and 8, inner surface 48 has a peak 108 and a valley 110 positioned adjacent to receivers 38 interconnected by a planar surface 112. As all inner surfaces 48 of the invention, peak 108 and valley 110 and surface 112 define an inner surface 48 and guide surface 56 with a geometric shape that is unchanged by inverting members 12 and 14. Surfaces 48 are also complementary such that they fit together with all surfaces contiguous as shown in FIGS. 7 and 8 in assembled configuration 28. Similar to surfaces 48, 56 of other embodiments, the surfaces 48, 56 of peak 108 and valley 110 and planar surface 112 are sufficiently smoothed to have low frictional resistance when sliding against each other. Planar surface 112 is divided by trench 50. Like peak 108, valley 110, and surface 112, trench 50 extends the entire length of each member 12, 14. In assembled configuration 28, trenches 50 of first and second members 12, 14 both define a longitudinal bore 52 of constant cross-section. Bore 52 has a linear axis 54 which is parallel to the longest dimension of members 12, 14.

The embodiments of FIGS. 7 and 8, like the embodiments of FIGS. 2, 4, 5 and 6 can be connected together by placing the members 12, 14 with their attached panels 24, 26 together in an end to end relationship in both directions 90, 92 and 94, 96. The embodiments are unlike the embodiment of FIGS. 2 and 3 having lock parts 16, 18 which must be placed together by placing the panels 24, 26 with the members 12 and 14 connected one over the other and slid together in the direction 90, 92 as suggested in FIG. 3.

In the embodiments of FIGS. 7 and 8, irrespective of where a peak 108 first contacts valley 110 or surface 112 as the panels are placed together in an end to end relationship, peak 108, valley 110, and surface 112, guide surfaces 56 allow the respective panels to move toward each other into the position shown in FIGS. 2, 4, 5, 7 and 8 by sliding guide surfaces 56 one against the other.

With regard to the embodiments shown in FIGS. 7 and 8, the guide surfaces 56 function to align complementary parts as do the surfaces 56 in the embodiments shown in FIGS. 4 and 5, but there is no necessity to relatively accurately position the complementary parts in the embodiments of FIGS. 7 and 8 so that they may receive each other as there is with the embodiments of FIGS. 2 and 6.

Figure 10:
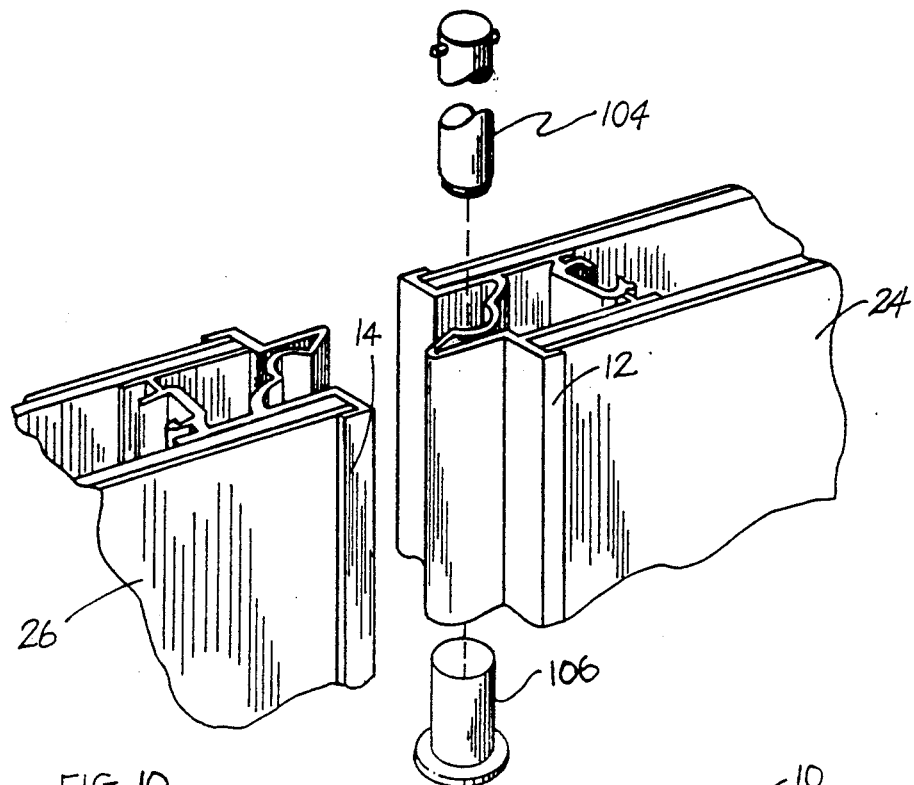
FIG. 10 is a partial perspective view of a lock mechanism for use with the panel connector of the invention alternative to that shown in FIG. 3.

Once the peaks 108, valleys 110, and surface 112 of interior surfaces 48 of respective panels are placed in a completely assembled configuration 28, as shown in FIG. 7, they can be connected together by lock parts 16, 18 as aforedescribed, within trench 50 or by positioning locking rod 104 within a partial length or the entire length of bore 52 from either the top or the bottom of the assembled configuration 28. As shown in FIG. 10, locking rods 104 and 106 alternately may be inserted in bore 52 from the top and bottom, respectively. The use of either locking rod 104 or locking rod 106 will lock members 12, 14 together in assembled configuration 28.

Now referring to FIG. 8, there is shown an extension 100 which can be placed on either side of the panel connector of the invention if the panels 24 and 26 are desirably spaced apart more than attachment portion allows. The extension 100 has a surface 114 which when the extension 100 is secured to the panel connector 10 of the invention is generally flush with the flange joints 76, 78, 80, 102 of the various embodiments. On opposite ends of the surface 114 are positioned a receiver 85 for the extended panel 24 or 26, as the case may be, and a notch 116 and tongue 118. Notch 116 basically covers the receiver 38 of the connector 10 which is not being used and the tongue 118 is used to secure by a suitable fastener 84 tongue 118 to the attachment portion 34.

While FIG. 8 shows only the use of a single extension 100, two extensions 100 can be used on opposite sides of each member 12, 14, and extensions 100 can be provided in different sizes in which the surface 114 is provided in different widths so as to provide panels 24, 26 of different widths, as desired.

Referring to FIG. 9, there are shown five different connectors and end caps each embodying the peak 108, valley 110, and surface 112 configuration of members 12, 14 of the embodiment shown in FIGS. 7 and 8. FIG. 9A illustrates an end cap 120 used for capping an exposed end of a composite panel 30. FIG. 9B illustrates a 60° connector 122 utilized to connect two panels disposed with respect to each other at an angle of 60°. FIG. 9C illustrates a T-connector 124 utilized to connect three composite panels 30 together in a T configuration with one of the panels at right angles to the remaining two panels which are aligned coplanarly. FIG. 9D illustrates a 90° connector 126 which is utilized to connect two composite panels 30 together at right angles thereby defining a rounded, exposed corner 128. FIG. 9E discloses a four-way connector 130 in which four composite panels are connected wherein each pair of panels are aligned coplanarly with another and with one pair aligned at 90° with respect to the other pair. While FIG. 9 illustrates connectors 122, 124, 126, and 130 and end caps 120 each having the configuration of the embodiments shown in FIGS. 7 and 8, it is to be understood and it is the intent that such end caps 120 and connectors 122, 124, 126, and 130 be provided for each of the embodiments shown in FIGS. 2, 4, 5 and 6, similarly.

In each of the embodiments shown in FIGS. 4, 5 and 7 through 10, members 12 and 14 have a complementary mating surface which is from about 35% to about 70% of the total width of the members 12 and 14. While the drawings are not to scale, the ratios of part sizes (not the exact sizing) can be determined by scaling the drawings. Specifically, FIG. 5 shows a panel connector in which the mating surfaces are about 40.6% of the width of members 12, 14. FIG. 4 shows a panel connector in which the mating surfaces are about 50% of members 12 and 14. FIG. 7 shows a panel connector in which the mating surface are about 68.8% of the members 12, 14. Because the mating surfaces are from about 35% to about 70% the width of members 12, 14, the members 12, 14 illustrated in FIGS. 4, 5 and 7 do not have to be exactly aligned before they can be moved together to be joined and connected together in a connected relation. Because of this structure, with the exception of those panel connectors shown in FIGS. 2 and 6, the panel connectors of the invention can be placed apart from about 10% to about 60% of the width of the members 12, 14 and still be moved together into a connected relation. As soon as the mating surfaces contact each other, the sliding surfaces guide the panels together by sliding one on the other into a connected relationship. The panel connector of FIG. 4 can be spaced apart about 50% of the width of the members 12, 14 and still be slid together. The panel connectors of FIG. 5 can be spaced apart approximately 43.8% of the width of the members 12, 14 and still be slid together. The panel connector of FIG. 7 can be spaced apart approximately 56.3% of members 12, 14 and still be slid together. In contrast, the panel connectors of FIGS. 2 and 6 must be generally aligned on the same axis before they can be slid together.

In use, panel connector 10 of the invention allows composite panels 30 to be easily assembled and disassembled by very limited movements of a first panel 24 and member 12 relative to a second panel 26 and member 14. Composite panels 30 may be used inverted, if desired, without changing assembly and disassembly procedures. In particular embodiments of the invention, production of composite panels 30 is also very easy, since members 12, 14 are identical and a composite panel 30 may be assembled from a pair of panels 24, 26, a pair of lock parts 16, 18, 104 and 106 and a single channel 46 of the invention (not separately illustrated) of sufficient length to be cut into first and second members 12, 14.

In alternative embodiments of the invention, first and second channels 46 are unitary with respective panels 24, 26. In alternative embodiments of the invention, members 12, 14 are not identical, but rather mirror images of each other. In alternative embodiments of the invention, first and second lock parts 16, 18 are unitary with respective bodies 44.

All panel connectors of the invention are easy to assemble, can be used to join large and heavy panels together with strength and rigidity, and yet provide for the assembly and disassembly of panels.

While the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A panel connector for use with panels, said panel connector comprising first and second members, said first and second members each having an axis and a complementary mating surface, said mating surfaces having a width greater than about 35% of the width of said first and second members, said members in response to forces applied generally parallel to said panels being slideable into a connected relation along said mating surfaces transversely of said axis in the direction of said sliding surfaces from a position spaced apart from about 10% to about 60% of the width of said members wherein said position is measured transversely of said panels, a lock having a lock part between said first and second members, respectively, said lock limiting movement in directions transversely of said axis, said lock being engaged and disengaged by axial movement of said coaxial lock part relative to at least one of said first or second members, whereby said panel connectors can be both easily assembled and disassembled.

2. The connector of claim 1 wherein said first and second members are connected to first and second panels, respectively, and said first and second panels are connected together in edge-to-edge relation to form a composite panel when said first and second members are assembled.

3. The connector of claim 1 wherein said lock part includes a member which is not secured to either said first and second members, said lock part being slideable between said members when said first and second members are in an assembled condition.

4. The connector of claim 1 wherein said panel connector in an assembled condition forms a vertically extending stud in a composite panel.

5. The connector of claim 1 wherein said members each have a peak and a channel when viewed in cross-section, said peak of each said member being interposed in said channel of the other of said members when said first and second members are assembled.

6. The connector of claim 1 wherein said members each have flanges extending outwardly therefrom, said flanges each being disposed against the flange of the other said member when said members are assembled.

7. The connector of claim 1 wherein said mating surfaces being generally complementary, said mating surfaces being generally contiguous over their entire lengths when said members are assembled.

8. The connector of claim 5 wherein said peaks and channels each have side surfaces and an end surface therebetween, respectively, said end and side surfaces of said peaks and channels being generally complementary.

9. The connector of claim 8 wherein said end and side surfaces of each said peak are generally contiguous over their entire lengths when said members are assembled.

10. The connector of claim 7 wherein said members each have a peak and a channel, said peak of each said member being interposed in said channel of the other of said members when said first and second members are assembled, said members each have flanges extending outwardly therefrom, said flanges each being disposed against the flange of the other said member when said members are assembled, said peaks and channels of said members being generally complementary, said peaks and channels being generally contiguous when said members are assembled wherein at least two said surfaces of each said member are engaged during said movement of said members, whereby said surfaces guide said movement.

11. The connector of claim 1 wherein said members in cross-section are inverted images of each other.

12. The connector of claim 1 wherein said members can be moved relative to each other forward and aft and inwardly and outwardly transverse to said linear axis.

13. The connector of claim 12 wherein relative movement of said members transverse to said axis disassembles said members.

14. The connector of claim 1 wherein said members are elongated.

15. The connector of claim 1 wherein said lock includes a trench in each of said members, said trenches together defining a central bore when said first and second members are assembled, and wherein said lock part is a rod which loosely plugs said bore.

16. The connector of claim 1 wherein said first and second members each have an attachment portion, each attachment portion having opposite outwardly facing surfaces and a compression slot therebetween, said attachment portion being compressible between spaced apart veneer panels and secured thereto by engagement of said outwardly facing surfaces with said veneer panels.

17. The connector of claim 1 wherein said members each have an attachment portion having oppositely facing surfaces, a plurality of barbs extending from each of said oppositely facing surfaces, said barbs being resiliently deformable, said attachment portion being adapted to be positioned between spaced apart veneer panels with said barbs deformed therebetween, whereby said attachment portion and said veneer panels are secured together.

18. The panel connector of claim 1 wherein said members each have an attachment portion, said attachment portion being secured between a pair of spaced apart veneer panels thereby forming a composit panel, and said first and second members each defining an edge of a composite panel.

19. The connector of claim 1 wherein each of said first and second members have an attachment portion and a panel receiver on both sides of said attachment portion, said panel receivers each receiving edges of spaced apart panels, respectively, with said attachment portion therebetween, said panel receivers and attachment portion securing a pair of said veneer panels to each of said first and second members, said first member pair of veneer panels being different from said second member pair of veneer panels, whereby said first and second members and said veneer panels form two different composite panels connected together by said first and second members in an assembled condition.

20. The panel connector of claim 1 wherein said first and second members each have an attachment portion and further comprising at least one extension member, said extension member being secured to said attachment portion and extending outwardly of said attachment portion, said extension member having a panel edge receiver therein, said connector having a panel edge receiver on the opposite side of said attachment portion from said extension, a pair of veneer panel edges being secured in said receivers with said attachment portion and at least one said extension therebetween, thereby forming a composite panel having a thickness greater than the thickness of said attachment portion and said veneer panels.

21. The connector of claim 20 further comprising two extension members, said extension members being secured to said connector on opposite sides of said attachment portion, said extension members each having a panel edge receiver, a pair of veneer panel edges being secured in said panel edge receivers, respectively, said panel connector being secured to said veneer panels by said extension members, wherein said connector and extension members and veneer panels form a composite panel having a thickness generally equal to the thickness of said veneer panels and said extension members and said attachment portion.

22. The connector of claim 1 wherein said mating surfaces of said members each have a pair of surface portions separated by said lock, the length of said surface portions measured perpendicularly of said axis being from about 40% to about 50% of the width of said member.

23. The connector of claim 22 wherein said surface portions are in the same plane.

24. The connector of claim 22 wherein said surface portions are not in the same plane.

25. The connector of claim 1 wherein said members each have a peak and a channel, said peak of each of said members being interposed in said channel of the other of said members when said first and second members are assembled, said members each have flanges extending outwardly therefrom, said flanges each being disposed against the flange of the other of said members when said members are assembled, said peaks and channels of said members being generally complementary, said peaks and channels being generally contiguous when said members are assembled, wherein at least two said surfaces of each said member are engaged during said movement of said members, whereby said surfaces guide said movement.

26. The connector of claim 1 wherein said members each include a trench, said trenches together defining a central bore when said first and second members are assembled, and wherein said lock part loosely plugs said bore.

27. The connector of claim 5 wherein said members each include a trench, said trenches together defining a central bore when said first and second members are assembled, and wherein said lock part loosely plugs said bore.

28. The connector of claim 6 wherein said members each include a trench, said trenches together defining a central bore when said first and second members are assembled, and wherein said lock part loosely plugs said bore.

* * * * *